(12) United States Patent
Krahwinkel

(10) Patent No.: US 8,742,034 B2
(45) Date of Patent: Jun. 3, 2014

(54) METHOD FOR THE HOMOGENEOUSLY CATALYZED PRODUCTION OF TERMINAL GROUP-CAPPED POLYETHERS

(75) Inventor: Ralf Krahwinkel, Langenfeld (DE)

(73) Assignee: Saltigo GmbH, Leverkusen, DE (US)

( * ) Notice: Subject to any disclaimer, the term of this patent is extended or adjusted under 35 U.S.C. 154(b) by 1099 days.

(21) Appl. No.: 12/518,938

(22) PCT Filed: Dec. 11, 2007

(86) PCT No.: PCT/EP2007/063718
§ 371 (c)(1),
(2), (4) Date: Dec. 1, 2009

(87) PCT Pub. No.: WO2008/074696
PCT Pub. Date: Jun. 26, 2008

(65) Prior Publication Data
US 2010/0076163 A1   Mar. 25, 2010

(30) Foreign Application Priority Data
Dec. 19, 2006   (DE) .................. 10 2006 059 954

(51) Int. Cl.
*C08F 283/06*   (2006.01)

(52) U.S. Cl.
USPC .......................................................... 525/540

(58) Field of Classification Search
CPC ...................................................... C08F 283/06
See application file for complete search history.

(56) References Cited

U.S. PATENT DOCUMENTS 5,187,211 A * 2/1993 Lundy et al. .................. 524/107

FOREIGN PATENT DOCUMENTS

| EP | 0296473 | | 12/1988 |
|----|---------|---|---------|
| GB | 1052301 | * | 4/1963 |
| GB | 1052301 | | 12/1966 |

OTHER PUBLICATIONS

Thomsan Gale, Superacids, 2006, World of Chemistry.*
WO Search Report from corresponding international Application No. PCT/EP07/63718 dated Apr. 9, 2008, 3 pages.

* cited by examiner

*Primary Examiner* — Randy Gulakowski
*Assistant Examiner* — Jeffrey Washville
(74) *Attorney, Agent, or Firm* — Nicanor A. Kohncke

(57) ABSTRACT

The invention provides an improved method for the production of terminal group-capped polyethers using homogeneous catalysis in the presence of Brönstedt acids.

9 Claims, No Drawings

METHOD FOR THE HOMOGENEOUSLY CATALYZED PRODUCTION OF TERMINAL GROUP-CAPPED POLYETHERS

The present invention relates to an improved process for the homogeneously catalyzed preparation of end group-blocked polyethers.

It is known that polycarbonates are suitable for a variety of applications in the medical sector because of their physical and mechanical properties. However, a problem in some applications is that polycarbonate resins tend to undergo yellowing and have increased opacity. The addition of a wide variety of stabilizers to polycarbonate molding compositions has therefore been proposed in the prior art. For example, EP-A-O 296 473 describes admixing polycarbonate molding compositions with specific stabilizers based on end group-blocked polyethers for the purpose of stabilizing them against γ-radiation.

3,4-Dihydro-2H-pyran is described in EP-A-O 296 473 as preferred substance for the end group-capping of the special polyethers. The preparation of these end group-capped polyethers can be carried out using a Brönsted acid such as p-toluenesulfonic acid, HCl or benzenesulfonic acid as catalyst. In EP-A-O 296 473, the focus is on the use of p-toluenesulfonic acid. The reaction is carried out in the presence of tetrahydrofuran as solvent. The work-up of the reaction mixture is complicated. After the reaction, excess p-toluenesulfonic acid has to be neutralized by addition of the base triethylamine. The reaction mixture subsequently has to be filtered to remove the triethylammonium p-toluenesulfonate salt formed and subsequently has to be distilled under reduced pressure to remove unreacted 3,4-dihydro-2H-pyran and the solvent from the product. Our own studies have shown that the 3,4-dihydro-2H-pyran-blocked polyethers obtained in this way become yellow and have unsatisfactory Hazen color numbers. This could be attributable to residual amounts of triethylammonium p-toluenesulfonate remaining in the polyether. 3,4-Dihydro-2H-pyran-blocked polyethers having such poor Hazen color numbers are not suitable for use as stabilizers in polycarbonate molding compositions.

Furthermore, GB-A-1,052,301 discloses blocking the OH end groups of block copolymers based on ethylene oxide and propylene oxide likewise with 3,4-dihydro-2H-pyran or with alkyl vinyl ethers. As possible catalysts, mention is made of sulfuric acid, hydrochloric acid, phosphoric acid or a strongly acidic cation exchanger. In all examples described, an 85% strength phosphoric acid is used as catalyst. Here too, a complicated work-up of the reaction mixture is necessary, i.e. neutralization of the excess acid with a base, removal of the unreacted blocking agent by distillation and filtration. The description of the color quality of the products shows that predominantly colored, sometimes even strongly colored, products are obtained. However, since these end group-blocked polyether polyols are used as components of a surface-active mixture, no attention is paid to the color of the end group-blocked polyether polyol.

Our own studies using the strongly acidic cation exchangers which are likewise mentioned in GB-A-1,052,301 have shown that this catalyst, too, leads to end group-blocked polyethers which show unacceptable discoloration, i.e. have an increased Hazen color number. In addition to these quality problems of the products obtained, heterogeneous catalysis using cation exchangers has further disadvantages; the reaction mixture has to be filtered to remove the catalyst after the reaction has been carried out. Handling of the catalyst is also complicated. The catalyst has to be washed, filtered off and dried before use. Reuse of the catalyst is difficult and accompanied by further work-up steps. Ultimately, the catalyst has to be disposed of by incineration.

It was therefore an object of the present invention to provide a process for the end group-blocking of polyethers, in which end group-blocked polyethers which have no discoloration and are thus suitable for applications in polymer molding compositions which have to be absolutely free of color are obtained.

The invention accordingly provides a process for preparing compounds of the general formula (I)

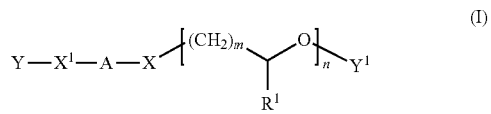

where $R^1$ is hydrogen, halogen, a straight-chain or branched $C_1$-$C_{10}$-alkyl, $C_6$-$C_{14}$-aryl, $C_7$-$C_{18}$-arylalkyl or $C_4$-$C_{10}$-cycloalkyl radical, n is an integer of at least 1, m is an integer of at least 1, X and $X^1$ are identical or different and are each oxygen, sulfur or —NH, A is a straight-chain or branched $C_1$-$C_{20}$-alkylene radical, a (—$CH_2$—$CH^2$—$X^2$—)$_p$—$CH_2$—$CH_2$— radical, where p is an integer from 2 to 20 and $X^2$ is oxygen, sulfur or —NH, or a —(CH$_2$)$_r$—$X^3$—(CH$_2$)$_s$— radical, where r and s are each, independently of one another, an integer from 1 to 20 and $X^3$ is oxygen, sulfur or an —NH radical, Y and $Y^1$ are identical or different and are each a radical having the general formula (II), (III) or (IV) below,

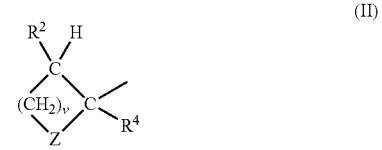

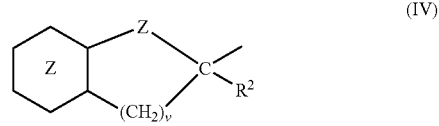

where the radicals Z are identical or different and are each oxygen, sulfur, an —NH radical or an —NCH$_3$ radical, v is an integer from 1 to 6, $R^2$, $R^3$ and $R^4$ are identical or different and are each hydrogen, a $C_1$-$C_{10}$-alkyl, $C_6$-$C_{14}$-aryl, $C_7$-$C_{18}$-arylalkyl or $C_4$-$C_{10}$-cycloalkyl radical, and the depiction of Z in the middle of the cyclohexyl ring of the formula (IV) means that one of the carbon atoms in the cyclohexyl ring can be replaced by a unit Z, or Y can also be a radical of the general formula (V),

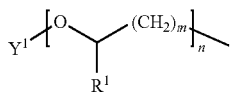 (V)

where m, n, $R^1$ and $Y^1$ have the meanings given above,
by reacting compounds of the general formula (VIa) and/or (VIb)

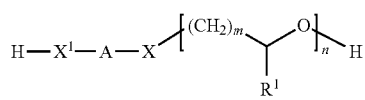 (VIa)

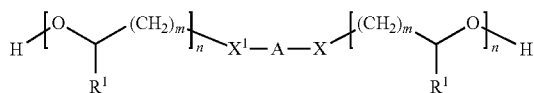 (VIb)

where m, n, $R^1$, X, A and $X^1$ have the corresponding meanings given above for the compounds of the general formula (I), with a compound of the general formulae (VII), (VIII) or (IX)

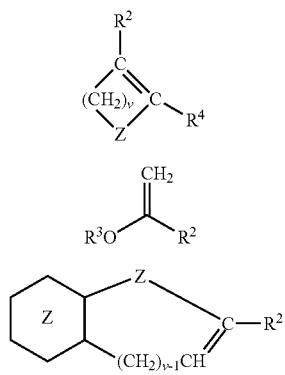

(VII)

(VIII)

(IX)

where $R^2$, $R^3$, $R^4$, Z and v have the same meanings as given above for the radicals of the general formulae (II), (III) and (IV),
characterized in that the reaction is carried out in the presence of a Brönsted acid present in water-free form as catalyst.

The end group-blocked compounds of the general formula (I) surprisingly have excellent color and significantly lower Hazen color numbers than the products which can be obtained by the processes of the prior art using aqueous HCl, phosphoric acid, p-toluenesulfonic acid or strongly acidic cation exchangers as catalysts. At the same time, the process of the invention is simple to carry out. Organic solvents do not have to be employed and complicated multistage work-up procedures as are required in the prior art do not have to be carried out: owing to the high catalytic activity, only very small amounts of the catalyst are used in the reaction and these can later remain in the product without problems. The products of the general formula (I) obtained by the process of the invention have a content of Brönsted acid which is in the range of only tens of ppm. The degree of blocking which can be achieved by the process of the invention is also significantly above the values obtained by the processes of the prior art. The degree of blocking (or capping) is usually monitored by measurement of the OH number. For this purpose, the reaction mixture is reacted with phthalic anhydride and the unreacted phthalic anhydride is titrated against NaOH.

It is important that the process of the invention is carried out in the presence of a Brönsted acid present in water-free form and the reaction is accordingly homogeneously catalyzed.

As Brönsted acid present in water-free form, it is possible to use, for example, HCl, HBr, HI, $H_2SO_4$ or $H_3PO_4$ in the process of the invention.

For the purposes of the present patent application, the expression "water-free form" means that the catalyst has a water content of not more than 0.05% by weight, preferably not more than 0.025% by weight.

For the purposes of the present patent application and invention, all general definitions or definitions in preferred ranges of radicals, parameters or explanations mentioned below can be combined with one another, i.e. also between the respective ranges and preferred ranges, in any way.

In a preferred embodiment, the process of the invention is used to prepare compounds of the general formula (I) by reacting compounds of the general formula (VIa) and/or (VIb)

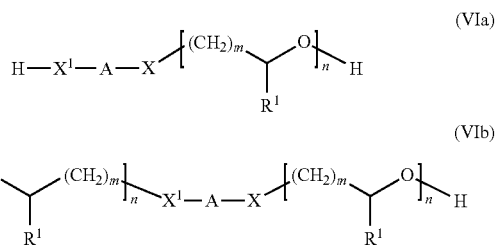

(VIa)

(VIb)

where $R^1$ is hydrogen, chlorine, bromine, iodine, a straight-chain or branched $C_1$-$C_{10}$-alkyl, $C_6$-$C_{10}$-aryl, $C_7$-$C_{12}$-arylalkyl or $C_4$-$C_8$-cycloalkyl radical, n is an integer in the range from 1 to 100, particularly preferably from 10 to 60, in particular from 10 to 50, m is an integer in the range from 1 to 10, in particular 1, X and $X^1$ are identical or different and are each oxygen, sulfur or an —NH radical, A is a straight-chain or branched $C_1$-$C_{10}$-alkylene radical, particularly preferably a $C_1$-$C_8$-alkylene radical, a (—$CH_2$—$CH_2$—$X^2$—)$_p$—$CH_2$—$CH_2$— radical, where p is an integer from 2 to 10 and $X^2$ is oxygen, sulfur or —NH, or a ($CH_2$)$_r$—$X^3$—($CH_2$)$_s$ radical, where r and s are each, independently of one another, an integer from 1 to 10 and $X^3$ is oxygen, sulfur or an —NH radical, with a compound of the general formula (VII), (VIII) or (IX),

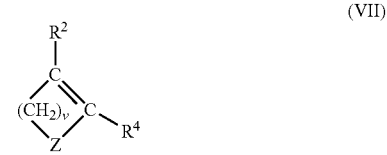

(VII)

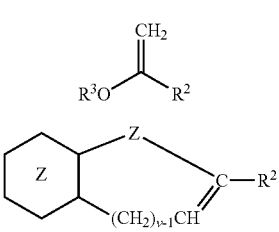

(VIII)

(IX)

where the radicals Z are identical or different and are each oxygen, sulfur or an —NH radical v is an integer from 1 to 6, in particular 2 or 3, $R^2$, $R^3$ and $R^4$ are identical or different and are each hydrogen, a straight-chain or branched $C_1$-$C_4$-alkyl, $C_6$-$C_{10}$-aryl, $C_7$-$C_{14}$-arylalkyl or $C_4$-$C_8$-cycloalkyl radical, and the depiction of Z in the middle of the cyclohexyl ring of the formula (IV) means that one of the carbon atoms in the ring can be replaced by a unit Z.

In a particularly preferred embodiment, the process of the invention is used to prepare compounds of the general formula (I) by reacting compounds of the general formula (VIa) and/or (VIb) in which $R^1$ is hydrogen or methyl, n is an integer in the range from 10 to 60, in particular from 10 to 50, m is 1, X and $X^1$ are identical or different and are each oxygen, sulfur or an —NH radical, A is a straight-chain or branched $C_1$-$C_{10}$-alkylene radical, particularly preferably a $C_1$-$C_8$-alkylene radical, in particular ethylene, propylene, n-butylene, n-pentylene or n-hexylene, a (—$CH_2$—$CH_2$—$X^2$—)$_p$—$CH_2$—$CH_2$— radical, where p is an integer from 2 to 10 and $X^2$ is oxygen, sulfur or —NH, or a (CH$_2$)$_r$—$X_3$—(CH$_2$)$_s$ radical, where r and s are identical and are each an integer from 1 to 10 and $X^3$ is oxygen, sulfur or an —NH radical, with a compound of the general formula (VIIa)

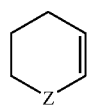

(VIIa)

where Z is oxygen, sulfur or an —NH radical,
in the presence of HCl present in water-free form.

The process of the invention is particularly preferably carried out using 3,4-dihydro-2H-pyran as compound of the general formula (VIIa).

The compounds of the general formulae (VIa) and (VIb) can either be procured commercially or be prepared by methods known to those skilled in the art. Thus, for example, compounds of the formula H—$X^1$-A-X—H, where A, X and $X^1$ are as defined above, can be alkoxylated, e.g. using ethylene oxide or propylene oxide, and converted into the corresponding adducts. The compounds of the general formulae (VII), (VIII) and (IX), too, can either be procured commercially or be prepared by methods known to those skilled in the art.

In the process of the invention, the compound of the general formula (VII), (VIII) or (IX) is usually used in a molar amount based on the end groups which are present in the compound of the general formulae (VIa) and (VIb) and are to be blocked of from 3:1 to 5:1, preferably from 4:1 to 5:1.

It has been found to be useful firstly to dissolve the Brönsted acid present in water-free form in a small portion of the compound of the general formula (VIa) and/or (VIb) and then to place it together with the remainder of the compound of the general formula (VIa) and/or (VIb) in a reaction vessel. The compound of the general formula (II), (III) or (IV) is then added. The reaction system is subsequently heated. The reaction according to the invention is usually carried out at a temperature in the range from 60 to 80° C. It has been found to be useful to carry out the reaction at from 65 to 75° C., in particular from 70 to 74° C. The reaction is typically complete after from 4 to 8 hours.

The Brönsted acid present in water-free form is advantageously dissolved in such an amount of the compound of the general formula (VIa) and/or (VIb) that a from 1 to 10% strength, preferably 7-10% strength, solution is obtained. Based on the total amount of the compounds of the general formulae (VIa) and (VIb) to be reacted, from 0.1 to 2 mol %, preferably from 0.5 to 1 mol %, of catalyst are used.

After the reaction according to the invention, it is useful for the purposes of the work-up to separate off any excess of the compound of the general formula (VII), (VIII) or (IX) still present. This is usually effected by distillation. The product obtained can then be used directly without any further work-up, e.g. as stabilizer in polycarbonate molding compositions.

It is advantageous that the process of the invention is homogeneously catalyzed and can be carried out without use of solvents and without filtration steps.

EXAMPLES

Desmophen® PET 3600 is used in the following examples. This is a commercial product of BayerMaterialScience AG. Desmophen® PET 3600 is

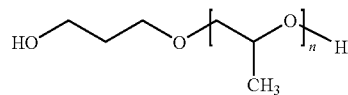

having a molecular weight of about 2000 g/mol.

Lewatit® K 1431 is a commercial product of Lanxess Deutschland GmbH and is a strongly acidic cation exchanger.

The Hazen color number was determined in accordance with DIN EN 1557.

Example 1

Comparison; Heterogeneous Catalysis Using a Strongly Acidic Cation Exchanger 440 g of Desmophen® 3600 and 62 g of Lewatit® K 1431 are placed under a nitrogen atmosphere in a reaction vessel at 20° C. The mixture was heated to 70-74° C. and 47.6 g of 3,4-dihydro-2H-pyran were added dropwise at this temperature over a period of one hour. The mixture was subsequently stirred at 70-74° C. for another 5 hours. Excess 3,4-dihydro-2H-pyran was subsequently removed under reduced pressure. After cooling to 20° C., the product was filtered off from the catalyst and bottled.

The 3,4-dihydro-2H-pyran-blocked polyether was obtained in a yield of 480 g and had an OH number of <30. It had a yellowish color and a Hazen color number of 30.

Example 2

Comparison; Use of p-Toluenesulfonic Acid 315 g of Desmophen® 3600 and 0.4 g of p-toluenesulfonic acid were placed in a reaction vessel. At 70-74° C., 34 g of 3,4-dihydro-2H-pyran were added dropwise over a period of 50 minutes. The mixture was subsequently stirred at 70-74° C. for another 5 hours. The mixture became very yellow during this time (Hazen color number >50) and had to be discarded in its entirety.

Example 3

Comparison; Homogeneous Catalysis Using Aqueous HCl 220 g of Desmophen® 3600 and 0.06 g of aqueous HCl (37% strength) were placed in a reaction vessel at 20° C. 25 g of 3,4-dihydro-2H-pyran were added. The mixture was subsequently heated to 70-72° C. and stirred at this temperature for another 5 hours. Excess 3,4-dihydro-2H-pyran was subsequently removed under reduced pressure. After cooling to 20° C., the product was bottled.

The 3,4-dihydro-2H-pyran-blocked polyether was obtained in a yield of 240 g and had an OH number of 25 and a Hazen color number of 30. After a few days, the product became deeper yellow in color.

Example 4

According to the Invention; Homogeneous Catalysis Using Water-Free HCl 1110 g of Desmophen® 3600 and 1 g of Desmophen/water-free HCl (10%) were placed in a reaction vessel at 20° C. 120 g of 3,4-dihydro-2H-pyran were added. The mixture was subsequently heated to 70-74° C. and stirred at this temperature for another 5 hours. Excess 3,4-dihydro-2H-pyran was subsequently removed under reduced pressure. After cooling to 20° C., the product was bottled.

The 3,4-dihydro-2H-pyran-blocked polyether was obtained in a yield of 1200 g and had an OH number of <20 and a Hazen color number of 15. Even after a number of days, the product did not discolor.

The invention claimed is:

1. A process for preparing compounds of the general formula (I)

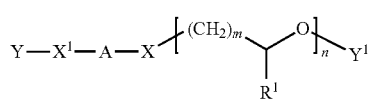
(I)

where
$R^1$ is hydrogen, halogen, a straight-chain or branched $C_1$-$C_{10}$-alkyl, $C_6$-$C_{14}$-aryl, $C_7$-$C_{18}$-arylalkyl or $C_4$-$C_{10}$-cycloalkyl radical,
n is an integer of at least 1,
m is an integer of at least 1,
X and $X^1$ are identical or different and are each oxygen, sulfur or —NH,
A is a straight-chain or branched $C_1$-$C_{20}$-alkylene radical, a $(-CF_2-CH_2-X^2-)_p-CH_2-CH_2-$ radical, where p is an integer from 2 to 20 and $X^2$ is oxygen, sulfur or —NH, or a $-(CH_2)_r-X^3-(CH_2)_s-$ radical, where r and s are each, independently of one another, an integer from 1 to 20 and $X^3$ is oxygen, sulfur or an —NH radical, Y and $Y^1$ are identical or different and are each a radical having the general formula (II), (III) or (IV) below,

(II)

(III)

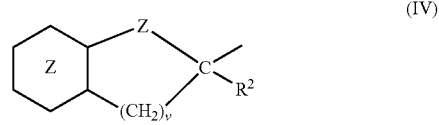
(IV)

where
the radicals Z are identical or different and are each oxygen, sulfur, an —NH radical or an —$NCH_3$ radical,
v is an integer from 1 to 6,
$R^2$, $R^3$ and $R^4$ are identical or different and are each hydrogen, a $C_1$-$C_{10}$-alkyl, $C_6$-$C_{14}$ aryl, $C_7$-$C_{18}$-arylalkyl or $C_4$-$C_{18}$-cycloalkyl radical, and the depiction of Z in the middle of the cyclohexyl ring of the formula (IV) means that one of the carbon atoms in the cyclohexyl ring can be replaced by a unit Z,
or
Y can also be a radical of the general formula (V),

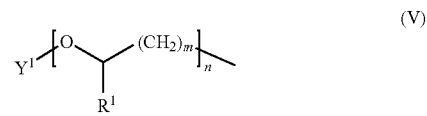
(V)

where m, n, $R^1$ and Y have the meanings given above,
by reacting compounds of the general formula (VIa) and/or (VIb)

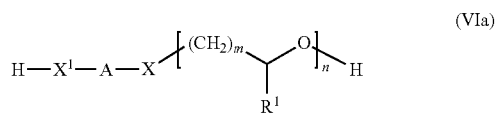
(VIa)

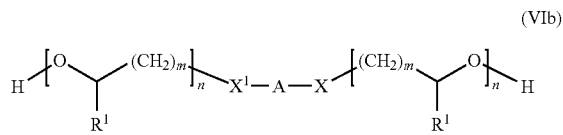
(VIb)

where m, n, $R^1$, X, A and $X^1$ have the corresponding meanings given above for the compounds of the general formula (I), with a compound of the general formulae (VII), (VIII) or (IX)

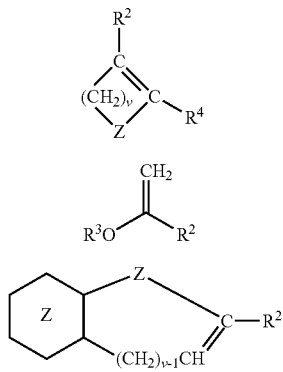

where $R^2$, $R^3$, $R^4$, Z and v have the same meanings as given above for the radicals of the general formulae (II), (III) and (IV), characterized in that the reaction is carried out in the presence of a Brönsted acid present in water-free form as catalyst and wherein the ratio of the compound of the general formula (VII), (VIII) or (IX) to the compound of the general formulae (VIa) and/or (VIb) is from 3:1 to 5:1, wherein the amount of the compound of the general formula (VII), (VIII) or (IX) per the ratio is based on the molar amount of end groups of the compound of the general formulae (VIa) and/or (VIb).

2. The process as claimed in claim 1, wherein HCl, HBr, HI, $H_2SO_4$ or $H_3PO_4$ is used as Brönsted acid present in water-free form.

3. The process as claimed in claim 1, wherein compounds of the general formulae (VIa) and/or (VIb) in which $R^1$ is hydrogen, chlorine, bromine, iodine, a straight-chain or branched $C_1$-$C_{10}$-alkyl, $C_6$-$C_{10}$-aryl, $C_7$-$C_{12}$-arylalkyl or $C_4$-$C_8$-cycloalkyl radical, n is an integer in the range from 1 to 100, m is an integer in the range from 1 to 10, X and $X^1$ are identical or different and are each oxygen, sulfur or an —NH radical, and A is a $C_1$-$C_8$-alkylene radical, a $(-CH_2-CH_2-x^2-)_p-CH_2-CH_2-CH_2-$ radical, where p is an integer from 2 to 10 and $X^2$ is oxygen, sulfur or —NH, or a $(CH_2)_r-X^3-(CH_2)_s$ radical, where r and s are each, independently of one another, an integer from 1 to 10 and $X^3$ is oxygen, sulfur or an —NH radical, are reacted with a compound of the general formula (VII), (VIII) or (IX) in which the radicals Z are identical or different and are each oxygen, sulfur or an —NH radical, v is an integer from 1 to 6, in particular 2 or 3, $R^2$, $R^3$ and $R^4$ are identical or different and are each hydrogen, a straight-chain or branched $C_1$-$C_4$-alkyl, $C_8$-$C_{10}$-aryl, $C_7$-$C_{14}$-arylalkyl or $C_4$-$C_8$-cycloalkyl radical, and the depiction of Z in the middle of the cyclohexyl ring of the formula (IV) means that one of the carbon atoms in the cyclohexyl ring can be replaced by a unit Z.

4. The process as claimed in claim 1, wherein compounds of the general formula (VIa) and/or (VIb) in which $R^1$ is hydrogen or methyl, n is an integer in the range from 10 to 60, in particular from 10 to 50, m is I, X and $X_1$ are identical or different and are each oxygen, sulfur or an —NH radical, A is a $C_1$-$C_8$-alkylene radical, in particular ethylene, propylene, n-butylene, n-pentylene or n-hexylene, a $(-CH_2-CH_2-X^2-)_p-CH_2-CH_2-$ radical, where p is an integer from 2 to 10 and $X^2$ is oxygen, sulfur or —NH, or a $(CH_2)_r-X^3-(CH_2)_s$ radical, where r and s are identical and are each an integer to 10 and $X^3$ is oxygen, sulfur or an —NH radical, are reacted with a compound of the general formula (VIIa)

where Z is oxygen, sulfur or an radical, and the reaction is carried out in the presence of HCl present in water-free farm.

5. The process as claimed in claim 1, wherein 3,4-dihydro-2H-pyran is used as compound of the general formula (VII).

6. The process as claimed in claim 1, wherein the Brönsted acid present in water-free form is firstly dissolved in a small portion of the compound of the general formula (VIa) and/or (VIb) and is then placed together with the remainder of the compound of the general formula (VIa) or (VIb) in a reaction vessel and the compound of the general formula (II), (III) or (IV) is then added.

7. The process as claimed in claim 1, wherein the reaction is carried out at a temperature in the range from 60 to 80° C.

8. The process as claimed in claim 1, wherein the Brönsted acid present in water-free form is dissolved in such an amount of the compound of the general formula (VIa) and/or (VIb) that a from 1 to 10% strength.

9. The process as claimed in claim 1, wherein, based on the total amount of the compound of the general formula (VIa) or (VIb) to be reacted, from 0.1 to 2 mol % of the Brönsted acid are used.

\* \* \* \* \*